United States Patent
Althoff et al.

(10) Patent No.: US 8,748,514 B2
(45) Date of Patent: Jun. 10, 2014

(54) AQUEOUS RELEASE AGENT AND ITS USE IN THE PRODUCTION OF POLYURETHANE MOLDINGS

(75) Inventors: Ralf Althoff, Haltern (DE); Torsten Henning, Schwerin (DE); Helmut Lammerting, Witten (DE)

(73) Assignee: Evonik Degussa GmbH, Essen (DE)

( * ) Notice: Subject to any disclaimer, the term of this patent is extended or adjusted under 35 U.S.C. 154(b) by 8 days.

(21) Appl. No.: 11/586,267

(22) Filed: Oct. 25, 2006

(65) Prior Publication Data
US 2007/0112083 A1 May 17, 2007

(30) Foreign Application Priority Data
Nov. 12, 2005 (DE) .......................... 10 2005 054 034

(51) Int. Cl.
*C08L 67/00* (2006.01)
*C08K 5/103* (2006.01)
*C08G 63/20* (2006.01)
*B01F 17/34* (2006.01)

(52) U.S. Cl.
USPC ............... 523/500; 521/65; 521/67; 525/418; 524/387; 524/389; 524/601; 106/38.22

(58) Field of Classification Search
USPC ............... 521/67, 65; 523/500; 524/387, 389, 524/601; 525/418; 106/38.22
See application file for complete search history.

(56) References Cited

U.S. PATENT DOCUMENTS

| 4,491,607 | A | * | 1/1985 | Wesala | 427/135 |
| H444 | H | * | 3/1988 | Roth et al. | 264/45.1 |
| 4,936,917 | A | | 6/1990 | Harakal et al. | |
| 5,137,966 | A | * | 8/1992 | Nodelman | 524/772 |
| 5,219,479 | A | * | 6/1993 | Mathiesen et al. | 508/494 |
| 2003/0192455 | A1 | * | 10/2003 | Six et al. | 106/38.22 |
| 2004/0127591 | A1 | * | 7/2004 | Haas et al. | 521/170 |

FOREIGN PATENT DOCUMENTS

| DE | 3742370 A1 | 6/1989 |
| DE | 4020036 A1 | 1/1992 |

* cited by examiner

*Primary Examiner* — Michael Pepitone
(74) *Attorney, Agent, or Firm* — Scully, Scott, Murphy & Presser, P.C.

(57) ABSTRACT

The invention relates to aqueous dispersions containing agents having release activity, emulsifiers and customary auxiliaries and additives, wherein a combination of
A) at least one agent having a release activity, selected from the group consisting of soaps, oils, waxes and silicones, and
B) polyesters
is used as agents having release activity.

17 Claims, No Drawings

AQUEOUS RELEASE AGENT AND ITS USE IN THE PRODUCTION OF POLYURETHANE MOLDINGS

FIELD OF THE INVENTION

The present invention relates to aqueous release agents and their use in the production of polyurethane moldings.

BACKGROUND OF THE INVENTION

It is known that the polyurethane systems used for the production of moldings show strong adhesion to the mold materials used, preferably thermally highly conductive materials, such as metals. In the demolding of the polyurethane moldings, release agents, which are applied to the mold walls coming into contact with polyurethanes and/or the polyurethane reaction mixture, are therefore required.

Such release agents consist of dispersions or emulsions of waxes, soaps, oils and/or silicones in solvents, such as hydrocarbons or water.

After application of the release agent to the mold, the solvent evaporates and the non-volatile substances having release activity form a thin release film which is intended to ensure that the polyurethane molding can be easily removed from the mold after production.

In addition to the actually required release effect, the release agent also performs further functions; thus, it also greatly influences the surface of the polyurethane molding, which should be fine-pored or smooth and uniform, inter alia also for ensuring good coverability of the finished shaped articles with textiles or leather.

In order to reduce the environmental pollution with organic material, there is considerable interest in water-based release agents that are free of volatile organic material. However, compared with classical release agents containing organic solvents, the aqueous release agents on the market have the disadvantage that, after evaporation of a major part of the water, a thin water film remains in the mold. This water film does not volatilize at the usual mold temperatures of from 45° to 80° C., preferably from 50° to 75° C., and undergoes with the isocyanate compounds of the polyurethane system reactions that lead to very rigid polyurea compounds. The mold surfaces are adversely affected as a result. The mold surfaces acquire a so-called build-up which has to be removed by complicated cleaning.

Typical examples of aqueous release agents having a good demolding effect are described, for example, in DE-A-37 42 370 or DE-A-40 20 036. These release agents contain, as a substance having release activity, unsaturated oligomeric or polymeric hydrocarbons having molecular weights of at least 500 and iodine numbers of at least 60, particularly preferably liquid polybutadiene having molecular weights of about 3000 and iodine numbers of about 450.

Particularly disadvantageous in the case of these release agents are the strong discolorations, which are caused by oxidation of the double bonds.

A further problem of the release agents cited above is the frequent occurrence of allergies among employees who work with these release agents or the shaped articles produced with their aid.

In addition to the above-described problem of the polyurea buildup on the mold surfaces, however, these release agents also have the further disadvantage that the viscous oily release substance greatly soils the working environment. A tacky greasy film which is difficult to remove forms on the machines and plants; even with considerable care, soiling of the environment cannot be avoided with certainty, so that a slippery greasy film, which is difficult to remove and constitutes an unacceptable potential hazard for the employees forms, for example, on the floors.

This greasy film can also further react owing to the double bonds present in the unsaturated polymeric hydrocarbons, for example to give resinous, tacky layers which can scarcely be removed with conventional cleaning agents.

U.S. Pat. No. 4,936,917 mentions, as substance having release activity, inter alia glyceryl fatty acid esters, for example, hydrogenated glyceryl tristearate, which are solid at the filling temperature of the mold. However, these solid substances having release activity cannot eliminate the above-described problems of the polyurea buildup in the mold, caused by aqueous release agents.

In view of the above, there is an ongoing need for providing aqueous mold release agents that are free of organic solvents, which have a good release effect, and which advantageously influence the surfaces of the polyurethane moldings, i.e., leave them fine-pored, uniform and smooth, leave behind no polyurea buildup on the mold surfaces, do not soil the working environment with a greasy film and have a low allergy potential.

SUMMARY OF THE INVENTION

Surprisingly, it has been found that a dispersion of classical substances having release activity, such as waxes, soaps, oils and/or silicones, in amounts of from 0.5 to 40% by weight, preferably from 3 to 20% by weight, together with polyesters in amounts of from 0.1 to 15% by weight, preferably from 0.5 to 10% by weight, in water overcomes all of the drawbacks mentioned with prior art release agents.

The present invention therefore relates to aqueous dispersions containing substantially water, agents having release activity and emulsifiers, wherein a combination of
A) at least one agent having a release activity, selected from the group consisting of soaps, oils, waxes and silicones, and
B) polyesters
is used as agents having release activity.

The invention further relates to aqueous dispersions containing agents having release activity, emulsifiers and customary auxiliaries and additives, which consist of a combination of
A) from 0.5 to 40% by weight of at least one agent having release activity, selected from the group consisting of soaps, oils, waxes and silicones, and
B) from 0.1 to 15% by weight of polyesters,
C) from 0.1 to 10% by weight of emulsifiers,
D) from 0.1 to 5% by weight of catalysts,
E) from 0.1 to 5% by weight of foam stabilizers,
F) from 0.1 to 5% by weight of viscosity modifiers,
G) from 0.1 to 2% by weight of customary preservatives, bactericides, fungicides and antioxidants, and
H) water to 100% by weight.

The present invention also relates to the use of these release agents in the production of polyurethane moldings.

DETAILED DESCRIPTION OF THE INVENTION

As stated above, the present invention provides a dispersion of classical substances having release activity, such as waxes, soaps, oils and/or silicones, in amounts of from 0.5 to 40% by weight, preferably from 3 to 20% by weight, together with polyesters in amounts of from 0.1 to 15% by weight, preferably from 0.5 to 10% by weight, in water.

Suitable polyesters that can be employed in the present invention are condensates of polyhydric alcohols and monobasic fatty acids, which may be optionally substituted and/or may optionally contain double bonds.

At least one compound selected from the group consisting of diols, in particular monoethylene glycol, diethylene glycol, triethylene glycol, tetraethylene glycol, propylene glycol, butylene glycol, triols, in particular trimethylolpropane, or other polyhydric polyols, in particular pentaerythritol, is used as the polyol.

Fatty acids, which may be used, are the customary monobasic fatty acids known in the art and they are based on natural vegetable or animal fats and oils, having 6 to 22 carbon atoms, in particular having 14 to 18 carbon atoms, and having a chain length of $C_6$ to $C_{22}$, preferably $C_{12}$ to $C_{22}$, such as caproic acid, caprylic acid, capric acid, lauric acid, myristic acid, palmitic acid, palmitoleic acid, isostearic acid, stearic acid, oleic acid, linoleic acid, petroselinic acid, elaidic acid, arachidic acid, behenic acid, erucic acid, gadoleic acid, rapeseed oil fatty acid, soybean oil fatty acid, sunflower oil fatty acid, tall oil fatty acid. In principle, all fatty acids having a similar chain distribution are suitable, preferably isostearic acid or oleic acid. The molar mass of the ester is preferably from 300 to 2000, more preferably from 500 to 1500, and most preferably from 1000 to 1300.

The esters are preferably liquid at room temperature.

The esters are neutral condensates having an acid number as low as possible, preferably less than 5 mg KOH/g and a hydroxyl number as low as possible, preferably less than 80 mg KOH/g.

The preferred polyesters are particularly kind (i.e., gentle) to the skin and are used, for example, as cosmetic oils, so that no contact allergies are expected.

Suitable polyesters are sold, for example, under the trade name Dub® (Stearinerie Dubois), Prisorine® (Uniqema) or Crodamol® (Croda).

According to the present invention, for example, the following can be concomitantly used as classical substances having release activity and having average molar masses greater than 200, preferably 500, in amounts of from 0.5 to 40% by weight, preferably from 2 to 15% by weight:

Waxes, i.e., liquid, solid, natural or synthetic waxes, also oxidized and/or partly hydrolyzed, esters of carboxylic acids with alcohols or fatty alcohols, metal salts, such as alkali metal or alkaline earth metal salts of fatty acids, oils and hydrocarbons which are liquid or viscous at room temperature, optionally but not preferably, with concomitant use of unsaturated oligomeric and/or polymeric hydrocarbons, silicones, such as polydimethylsiloxanes, optionally substituted by aliphatic or aromatic hydrocarbon radicals.

As customary auxiliaries and additives, one or more compounds may be selected from the group consisting of
I) emulsifiers:
anionic emulsifiers, such as alkyl ether carboxylates, alkyl sulfates, fatty alcohol ethoxylate ether sulfates, alpha-olefinsulfonates, alkyl phosphates, alkyl polyether phosphates, alkyl sulfosuccinates; nonionic emulsifiers, such as ethoxylated fatty alcohols, ethoxylated oxo alcohols and other alcohol ethers, fatty amines, such as dimethylalkylamines, fatty acid alkanolamides, fatty acid esters with alcohols, including glyceryl esters or polyglyceryl esters or sorbitol esters; cationic emulsifiers, such as alkyldimethylamines which have been rendered acidic, quaternary nitrogen compounds; finally zwitterionic surfactants, which are concomitantly used in amounts of from 0.1 to 10% by weight, preferably from 0.5 to 6% by weight;

II) catalysts:
those which are typically used for the polyurethane reaction, for example Lewis acids, such as tin compounds, or Lewis bases such as tertiary amines;

III) foam stabilizers:
polysiloxane/polyether copolymers;

IV) viscosity modifiers:
typical thickeners, such as polyacrylic acid derivatives designated as carbomers, or other polyelectrolyte thickeners, such as water-soluble cellulose derivatives or xanthan gum; aliphatic hydrocarbons, i.e., petroleum ether fractions, which swell the waxes used and thus have a thickening effect, may also be regarded as viscosity modifiers in aqueous formulations;

V) customary preservatives, bactericides, fungicides and antioxidants.

The dispersions according to the invention can be prepared by the processes known in the prior art. In a preferred procedure, the emulsifier is initially introduced with substances which have release activity and are in molten form (below the boiling point of water), a part of the water is introduced under high shear force and then the remaining water containing the further components is added with low shear force.

Classically, the mold is brought to the desired mold temperature of from 45° to 80° C., preferably from 50 to 75° C., and sprayed with release agent, a certain time—from about 1 to 10 minutes depending on the amount of water—is allowed to pass until the major amount of water has evaporated, and the reactive polyurethane system comprising polyols, polyisocyanates and optionally further additives, such as catalysts, foam stabilizers and blowing agents, is then pumped in. The mold is closed and, after the curing time, the mold is opened and the shaped article is removed.

The following examples serve for describing the invention in more detail without limiting it thereto.

List of substances used:

Dub® PG V=propylene glycol tetraoleate, manufacturer: Stearinerie Dubois,

Prisorine® 3631=pentaerythrityl tetraisostearate, manufacturer: Uniqema,

DC® 190=polyether siloxane, manufacturer: Air Products,

Polyol® 130=polybutadiene having an average molar mass of about 3000 and iodine number of about 450 g of iodine/100 g, manufacturer: Degussa, Unithox® 450=ethoxylated alcohol having an average molar mass of about 900, containing 50% by weight of ethylene oxide, corresponding to that used in example 1 from DE-A-40 20 036, manufacturer: Baker Petrolite, Fatty amine=R-NH$_2$, where R=$C_{12-22}$, optionally branched, alkyl radicals, Microwax=commercially available waxes having a solidification temperature of from 50° to 90° C., Polyethylene wax=commercially available waxes having a solidification temperature of from 50° to 90° C., Desmophen® PU 21IK01=polyetherpolyol, manufacturer: Bayer, Tegoamin® TA 33, manufacturer: Degussa, Tegoamin® AS-1, manufacturer: Degussa, Tegostab® EP-K-38=organomodified siloxane, manufacturer: Degussa, Suprasec® 2412=diphenylmethane 4,4'-diisocyanate, manufacturer: Huntsman.

EXAMPLE 1

Release Agent 1:
  1% by weight of polyethylene wax (solidification point 60° C.), 5% by weight of microwax (solidification point 70° C.), 1% by weight of fatty amine, 0.02% by weight of acetic acid (60% in water), 3% by weight of Dub® PG V, 1% by weight of DC® 190, 88.98% by weight of water.

EXAMPLE 2

Release Agent 2:
  1% by weight of polyethylene wax (solidification point 60° C.), 5% by weight of microwax (solidification point 70° C.), 1% by weight of fatty amine, 0.02% by weight of acetic acid (60% in water), 10% by weight of Dub® PG V, 1% by weight of DC® 190, 81.98% by weight of water.

EXAMPLE 3

Release Agent 3:
  1% by weight of polyethylene wax (solidification point 60° C.), 5% by weight of microwax (solidification point 70° C.), 1% by weight of fatty amine, 0.02% by weight of acetic acid (60% in water), 2% by weight of Prisorine® 3631, 1% by weight of DC® 190, 89.98% by weight of water.

EXAMPLE 4

Release Agent 4:
  1% by weight of polyethylene wax (solidification point 60° C.), 5% by weight of microwax (solidification point 70° C.), 1% by weight of fatty amine, 0.02% by weight of acetic acid (60% in water), 8% by weight of Prisorine® 3631, 1% by weight of DC® 190, 83.98% by weight of water.

COMPARATIVE EXAMPLE A (Based on Example No. 1 from DE-A-40 20 036)
  16% by weight of Polyol® 130, 4% by weight of Unithox® 450, 1% by weight of DC® 190, 79% by weight of water.
Release Agent Experiments:
  The release agents were sprayed onto test metal plates by means of a 0.5 mm nozzle in amounts of 20 g/m² similar to those used in practice, and a foamable polyurethane system consisting of 100 parts of Desmophen® PU 21IK01, 3.5 parts of water, 0.4 part of Tegoamin® TA 33, 0.25 part of Tegoamin® AS-1, 0.7 part of diethanolamine, 0.5 part of Tegostab® EP-K-38, 0.2 part of acetic acid (60% in water) and 63.5 parts of Suprasec® 2412 was foamed on these sheets in a box mold at 55° C.
  After curing (10 minutes) the metal sheets were peeled off from the foam using a spring force meter, in order to measure the extent of the release effect.
Evaluation Of The Release Experiments:

| Evaluation of the release experiments: | | |
| --- | --- | --- |
| Release agent | Force for peeling off the metal sheet from the foam[kg] | Assessment of the foam surface |
| 1 | 3.0 | slightly closed, dry |
| 2 | 2.8 | slightly closed, dry |
| 3 | 2.1 | slightly closed, dry |
| 4 | 2.3 | slightly closed, dry |
| A | 2.0 | slightly closed, greasy. |

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. An aqueous dispersion comprising water, one or more emulsifiers, and a release agent composed of a combination of A) one or more agents having a release activity selected from the group consisting of soaps, waxes, and silicones, wherein said one or more agents having a release activity are present in an amount of 0.5 to 40% by weight of the aqueous dispersion, and B) a polyester that is a condensate of pentaerythritol and at least one monobasic fatty acid, wherein said polyester is liquid at room temperature and is present in an amount of 0.1 to 15% by weight of the aqueous dispersion.

2. The aqueous dispersion as claimed in claim 1, including from 0.1 to 10% by weight of said one or more emulsifiers, from 0.1 to 5% by weight of catalysts, from 0.1 to 5% by weight of foam stabilizers, from 0.1 to 5% by weight of viscosity modifiers, from 0.1 to 2% by weight of customary preservatives, bactericides, fungicides and antioxidants, and said water to 100% by weight.

3. The aqueous dispersion as claimed in claim 1, wherein the one or more agents having a release activity have an average molar mass of less than 200.

4. The aqueous dispersion as claimed in claim 1, further comprising at least one compound selected from the group consisting of liquid, solid, natural or synthetic waxes, esters of carboxylic acids with alcohols or fatty alcohols, metal soaps, and silicones.

5. The aqueous dispersion as claimed in claim 1, wherein said polyester has a molar mass of 300 to 2000.

6. The aqueous dispersion as claimed in claim 1, wherein said polyester has an acid number of less than 5 mg KOH/g and a hydroxyl number of less than 80 mg KOH/g of substance.

7. The aqueous dispersion as claimed in claim 1, wherein said one or more emulsifiers are selected from the group consisting of anionic, cationic, zwitterionic and nonionic surfactants.

8. A method for producing a polyurethane molding comprising adding an aqueous dispersion to surfaces of a mold prior to adding a reactive polyurethane system to said mold, wherein said aqueous dispersion comprises water, one or more emulsifiers, and a release agent composed of a combination of A) one or more agents having a release activity selected from the group consisting of soaps, waxes, and silicones, wherein said one or more agents having a release activity are present in an amount of 0.5 to 40% by weight of the aqueous dispersion, and B) a polyester that is a condensate of pentaerythritol and at least one monobasic fatty acid, wherein said polyester is liquid at room temperature and is present in an amount of 0.1 to 15% by weight of the aqueous dispersion.

9. The method as claimed in claim 8, wherein said mold is heated prior to adding the aqueous dispersion to said mold.

10. The method as claimed in claim 9, wherein said mold is heated to a temperature from 45° to 80° C.

11. The method as claimed in claim 8, wherein said aqueous dispersion further comprises C) from 0.1 to 10% by weight of said emulsifiers, D) from 0.1 to 5% by weight of catalysts, E) from 0.1 to 5% by weight of foam stabilizers, F) from 0.1 to 5% by weight of viscosity modifiers, G) from 0.1 to 2% by weight of customary preservatives, bactericides, fungicides and antioxidants, and H) said water to 100% by weight.

12. The method as claimed in claim 8, wherein the agents having a release activity have an average molar mass of less than 200.

13. The method as claimed in claim 8, wherein said aqueous dispersion further comprises at least one compound selected from the group consisting of liquid, solid, natural or synthetic waxes, esters of carboxylic acids with alcohols or fatty alcohols, metal soaps, and silicones.

14. The method as claimed in claim 8, wherein said polyester has a molar mass of 300 to 2000.

15. The method as claimed in claim 8, wherein said polyester has an acid number of less than 5 mg KOH/g and a hydroxyl number of less than 80 mg KOH/g of substance.

16. The method as claimed in claim 8, wherein said one or more emulsifiers are selected from the group consisting of anionic, cationic, zwitterionic and nonionic surfactants.

17. The aqueous dispersion as claimed in claim 1, wherein said polyester has a molar mass of 1000 to 2000.

* * * * *